United States Patent [19]
Wilson et al.

[11] Patent Number: 5,520,446
[45] Date of Patent: May 28, 1996

[54] EMERGENCY BRAKE RELEASE

[76] Inventors: Larry Wilson, 5825 Sundance Ct.;
Wayne Smozanek, 18158 Jupiter
Landing Dr., both of Jupiter, Fla. 33458

[21] Appl. No.: 365,596

[22] Filed: Dec. 28, 1994

[51] Int. Cl.$^6$ ............................................ B60T 13/22
[52] U.S. Cl. ................... 303/9.76; 188/170; 303/15;
303/71; 303/DIG. 3
[58] Field of Search ...................... 303/9.76, 71, 15,
303/68, 69, 3, 9, 13, 14, 15, 16, 18, 78,
DIG. 3, 89, 85; 188/170, 265

[56] References Cited

U.S. PATENT DOCUMENTS

| | | | |
|---|---|---|---|
| 3,272,566 | 9/1966 | Clack | 188/170 |
| 3,456,988 | 7/1969 | Gibbons et al. | 303/9.76 |
| 4,191,428 | 7/1978 | Durling . | |
| 4,824,178 | 4/1989 | Petersen | 303/71 |
| 5,118,165 | 6/1992 | Latvala | 303/9.76 |
| 5,172,958 | 12/1992 | Sell . | |
| 5,286,095 | 2/1994 | Sell . | |
| 5,370,449 | 12/1994 | Edelen et al. | 303/9.76 X |

*Primary Examiner*—Douglas C. Butler
*Attorney, Agent, or Firm*—McHale & Slavin

[57] ABSTRACT

The instant invention is a positive shutoff valve for use on emergency vehicles so as to maintain air within a reservoir tank allowing immediate movement of an emergency vehicle upon start up. The shutoff valve is operated by a switch located in the operator's compartment of the emergency vehicle providing movement of a solenoid located in the shutoff valve which is biased in a normally closed position. A manual bypass lever is provided should the electric solenoid fail to operate correctly. The shutoff valve positively maintains air within the reservoir tank and is monitored by a low pressure switch and alarm sensor which will indicate low air pressure in the reservoir tank even when the vehicle is in an off position.

7 Claims, 1 Drawing Sheet

EMERGENCY BRAKE RELEASE

FIELD OF THE INVENTION

The instant invention is related to air brake systems and in particular to a device for initiating an immediate release of air to the braking system of emergency vehicles allowing immediate movement of the vehicle.

BACKGROUND OF THE INVENTION

Large vehicles employ an air brake system which is based upon the positioning of brake linings against a brake drum by use of biasing springs. In order for the brake system to be released, air pressure is used to compress the biasing springs thereby releasing the brakes. A benefit of such a braking system is that if the vehicle loses power or otherwise has a failure in the braking system, air pressure is lost causing the biasing springs to engage the brake drums thereby locking the wheels to prevent further movement. Release of the brakes requires air pressure of at least 80 PSI with normal operation of the system requiring approximately 125 PSI.

It is common for a braking system to lose pressure due to wear of pneumatic components and their associated seals. The Society of Automotive Engineers acknowledges pressure loss with a recommendation that pressure loss does not exceed 1.5 PSI per minute. This loss is acceptable in most instances as the system replenishes the air supply by use of an air compressor mounted on the vehicle. When the vehicle is not operational, the pressure to the biasing springs is removed causing the brakes to engage in a parking brake mode. During non-operation, it is not uncommon for the air to slowly escape until the air reservoir has fallen below an operating pressure capable of biasing the springs in an open position for release of the brakes. Thus, when a vehicle having an air brake system is started it can take up to ten minutes for the air compressor to build sufficient air pressure in order to fill the braking system allowing for the release of the parking brakes.

The problem is that in many situations it has been found that such a delay can result in life threatening circumstances. For instance, emergency vehicles such as fire trucks must either constantly replenish worn air system lines or wait sometimes up to five or ten minutes for the vehicle to build sufficient pressure in order for the fire truck to be moved. Furthermore, mechanical air pumps require high RPM's requiring the operator to race the engine immediately upon start-up to fill the reservoir. This leads to early engine wear and adds to the confusion during an emergency.

Delay is unacceptable in an emergency. For this reason, emergency personnel are instructed, upon the notification of an alarm, for one operator to immediately start the vehicle while the remainder of the crew readies for the emergency situation. Alternatively, it has been found that emergency stations use a separate air compressor used by mechanics to maintain tire air pressure to supply a constant pressure to the vehicle's air supply system. The disadvantages of external air are obvious. If the external supply line is not disconnected before the vehicle is moved, the line may damage the air reservoir disabling the vehicle. In stations where ten or fifteen vehicles may be employed, the multiplicity of external supply lines leaves hoses on the floor which can easily lead to accidents.

Various teachings set forth elaborate braking systems for accommodating the air pressure system, yet none of the prior art addresses the problem with emergency vehicles and the need for an instant supply of pressure for proper operation.

U.S. Pat. No. 4,191,428 discloses a vehicle air brake system having a pressure holding valve which maintains the air chambers of the parking brakes at a predetermined pressure level even if the air brake system is operating at a pressure level lower than the spring biasing position. While this invention discloses the need to prevent air brake lockup while the vehicle is in operation, it does not address the need for maintaining reservoir pressures while the vehicle is not operational.

U.S. Pat. No. 5,172,958 discloses an air brake control system for use with truck trailers. A fully discharged system requires air pressure for operation in which an emergency glad hand supply line builds pressure. Valves in the trailer cooperate to route all the air directly to charge the spring brake chambers, by-passing the air reservoir allowing for biasing of the brake springs so that emergency movement of the vehicle may be achieved. This system operates for emergency situations of the vehicle itself and not the situation. By simply pressurizing up the brake biasing springs the vehicle may be moved; however it is unsafe for operation on the road as the reservoir has insufficient pressure for normal operation.

U.S. Pat. No. 5,286,095 discloses yet another improvement in an air brake system which discloses the use of a valve which couples to the reservoir allowing only a predetermined amount of air to enter the reservoir before the valve diverts the air directly to the brake system for use in compression of the biasing springs. This invention allows minimal pressurization of the system before operation of the vehicle, thereby allowing the trailer to be moved under emergency situations should the air reservoir be damaged or ruptured. Depending on the size of the vehicle, this may take minutes to achieve operation yet the reservoir may have insufficient air for proper operation.

DOT regulations 49 C.F.R §571.121 requires that reservoirs on air brake systems be protected against loss of air pressure due to failure or leakage in the system between the service reservoir and the source of air pressure by check valves and that each reservoir shall have a condensate drain that can be manually operated. The air compressor must be of sufficient capacity to increase air pressure in the supply line and surface reservoirs from 85 pounds per square inch to 100 pounds per square inch when the engine is operating at the vehicles manufactured maximum recommended RPM within a time, in seconds, determined by the actual reservoir capacity times 25 divided by the required reservoir capacity. No provisions are taught for control of air during non-operation.

Thus what is needed in the art is a low cost means of providing emergency vehicles with the ability to immediately release the parking brakes upon demand by maintaining sufficient pressure within the system for proper operation.

SUMMARY OF THE INVENTION

This invention is directed to an emergency control valve for maintaining a fixed amount of pressure within a sealed reservoir tank for use on emergency vehicles allowing immediate brake release. The shutoff valve of the instant invention operates in conjunction with a conventional air reservoir and is directly between the reservoir and main control valve. The shutoff valve is normally closed preventing the flow of air from the reservoir to the brake lines by use of a cab mounted electrical switch to operate an electrical solenoid. When the switch is in the off position, the shutoff valve maintains air pressure within the reservoir by providing a positive seal relying upon the required use of a non-leak check valve used to prevent back flow into the air compressor. During non-use the switch works as a secondary emergency brake actuator by preventing the replenishing of air to the brake system unless the switch is placed in the on position after the ignition switch is operated. When the switch is in the on position the valve provides unlimited air flow from the reservoir to the brakes by use of oversized inlet and delivery ports. A third port, or alternatively coupling a divider to the inlet port is used for placement of a low pressure switch having an alarm system coupled directly to the battery which will sound should the pressure in the reservoir drop below a predetermined minimum value. The alarm indicates a leakage that the reservoir does not contain sufficient air to accomplish an emergency start-up. This allows operators of the vehicle to recognize that the vehicle has a problem when the engines are at rest. Leakage is typically attributable to the check valve which can be serviced during routine maintenance.

The emergency start-up made possible by the instant valve invention has a primary usage in emergency vehicles where conventional brake system operation is delayed until the reservoir is filled. While it may be contemplated that manual systems of the prior art may be automated, no such teaching shows the use of a positive seal provided by a biased valve having an electrically actuated solenoid.

A manual override is provided, allowing the operator to bypass the electric solenoid by physically forcing the positive seal from its normally closed position into an open position. This allows operation of the braking system in its conventional manner requiring the compressor to be operated at high RPM before the braking system will have sufficient pressure in order to operate.

Thus, an objective of the instant invention is to provide an electrically actuated positive seal to a conventional air brake system reservoir tank for use in emergency vehicles so as to maintain pressure within the air reservoir allowing instantaneous operation of a brake system upon demand.

Yet still another objective of the instant invention is to teach the use of an alarm system for use with emergency vehicles which will operate when the vehicle is not running thus alerting that the reservoir does not have sufficient pressure in order to allow immediate operation of the braking system.

Yet still another objective of the instant invention is to Ii isolate a portion of a conventional air brake system for emergency use.

Yet still another objective of the instant invention is to disclose the use of a shutoff valve for use in combination with conventional air brake systems allowing the retrofit of existing vehicles so as to eliminate the need for external air source supplies.

Yet still another objective of the instant invention is to provide a cab mounted lever capable of manual override of the reservoir isolator.

Other objectives and advantages of this invention will become apparent from the following description taken in conjunction with the accompanying drawings wherein are set forth, by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
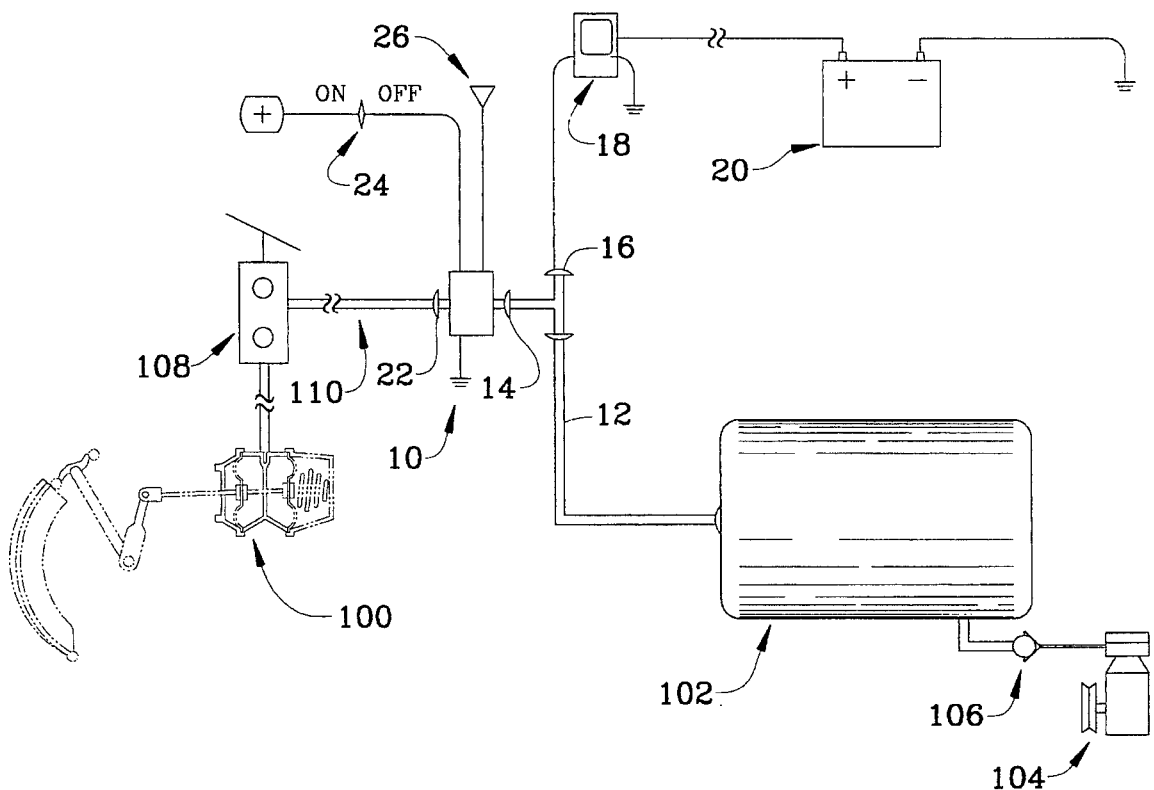
FIG. 1 is a flow diagram of a conventional air brake system with a shutoff valve of the instant invention installed.

Now referring to FIG. 1, shown is the instant invention 10 which is a shutoff valve for use in conjunction with a conventional air brake parking system. The air brake system consists of a set of spring set air released parking brakes 100, only one of which is illustrated, which is supplied air by the use of at least one air holding reservoir 102 pressurized by use of an air pump 104 having a unidirectional check valve 106 to prevent air from leaking through the pressure pump. A control valve 108 is used having a foot activated lever located in the operator's compartment of the vehicle to control the air supply to the brakes 100. If the control valve 108 is engaged, air located after the control valve 108 is released to atmosphere allowing the brakes 100 to engage by use of spring biased brake actuators which are disengaged only upon the application of a sufficient amount of air. For this reason, the air reservoir is used to replenish the air within the system and through air lines 110 wherein sufficient air above a predetermined level will overcome the spring biasing allowing the wheels to be rotated freely. In this manner, should the air line be depleted of air pressure, the brakes will engage accordingly.

While a conventional air system is sufficient for most large vehicles, emergency vehicles cannot afford to wait the few minutes it takes to replenish the air reservoir 102 during start-up. It is common knowledge that the use of the control valve 108, as well as flexible fittings that couple to each of the brake locations, leak over time until the reservoir is depleted making it inoperative to move the vehicle until replenished.

The use of the instant invention is for emergency vehicles wherein the shutoff valve 10 is coupled directly to the air reservoir 102 by use of a solid pipeline 12. Alternatively the valve can be coupled directly to the reservoir. In the preferred embodiment the inlet port includes a low pressure sensor 16 which operates to monitor the amount of air within the air reservoir 102 providing a closed contact to alarm 18 which is electrically coupled directly to battery source 20. The alarm 18 would signal loss of pressure in the air reservoir 102 even when the vehicle is not operational. This will inform personnel who maintain the vehicle that the reservoir does not have sufficient air pressure in order to provide for an emergency start. The alarm will typically signal a failed check valve 106 or pipe connections through air line 12 if the shut-off valve is not mounted directly to the air reservoir.

The shutoff valve 10 has a delivery port 22 having a passageway to the inlet port 14 providing an unrestricted air flow between air lines 12 and 110. A control switch 24 is located in the operator's compartment of the vehicle and allows for the opening of the shutoff valve by actuation of a solenoid.

In operation, when an emergency vehicle is stopped and the 14 vehicle turned off, the shutoff valve automatically closes sealing air within the air reservoir by use of a positive seal. Once installed, the shut-off valve 10 maintains a supply of air within the reservoir 102 which can only be released upon the reopening of the shutoff valve. The system is allowed to drain only after delivery port 22 thus maintaining a large volume of air as necessary for emergency start up. When an operator is required to immediately move the vehicle, such as the case with fire trucks or paramedic vehicles where time is of the essence, the operator may start the vehicle and engage the pressure release switch 24 which electrically actuates the solenoid within the shutoff valve 10 allowing a free flow between the inlet port 14 and delivery port 22 allowing for the instant filling of the braking system so as to provide sufficient air to bias the springs allowing the wheels to rotate. A manual valve 26 allows for a manual bypass of the valve 10 by leveraging the solenoid piston in an open position allowing for the free flow of air through the shutoff valve.

Figure 2:
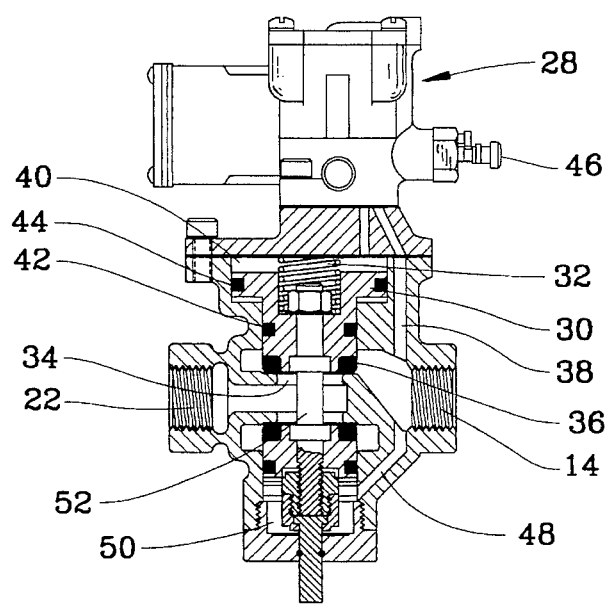
FIG. 2 is a cross-sectional side view of the shutoff valve of the instant invention.

FIG. 2 depicts a cross-sectional side view of the shutoff valve 10 having inlet port 14 and delivery port 22. Solenoid 28 operates piston 30 which is spring biased 32 in a closed position sealing an interconnecting port 34 by use of O-ring 36. Air bleed line 38 is communicated to an upper surface 40 of piston 30 to assist in biasing the piston in a closed position positively sealing interconnecting port 34. O-rings 42 and 44 provide sidewall sealing of the piston allowing the piston 30 to be moved without passage of air around the piston.

Manual bypass valve 46 may be used to open the shutoff valve 10 by movement of piston 30 in an upward position by directing air through passageway 48 into cavity 50 which will move piston rod 52 in an upward position moving piston 30 for the free flow between inlet port 14 and delivery port 22 through interconnecting port 34. The manual bypass actuator 46 is preferably placed within the operator's compartment of the vehicle using a handle coupled to the bypass actuator 46 should the operator need to bypass the solenoid. The inlet and outlet port is at least ¾ inch diameter with a recommended size of one inch to allow for an uninterrupted flow through the air brake system.

It is to be understood that while we have illustrated and described certain forms of our invention, it is not to be limited to the specific forms or arrangement of parts herein described and shown. It will be apparent to those skilled in the art that various changes may be made without departing from the scope of the invention.

What is claimed is:

1. An emergency vehicle air brake system having spring set air released parking brakes, air supply means having at least one air holding reservoir with a pressure pump and unidirectional check valve for supplying air at a predetermined pressure to said parking brakes during vehicle operation for releasing same and a control valve means interposed between said air supply means and said parking brakes for maintaining air in said parking brakes at said predetermined pressure while said vehicle is operating, the improvement comprises: a shutoff valve means having an inlet port coupled to an outlet connection of said reservoir and a delivery port coupled to said control valve means with a spring biased movable piston normally sealing said inlet port from said delivery port; a solenoid coupled to said piston; switch means positioned within an operator's compartment of said vehicle, said switch means electrically coupled to said solenoid to position said piston in a raised position providing an uninterrupted flow from said inlet port to said delivery port; wherein said shutoff valve maintains air in said reservoir when said emergency vehicle is not operational whereby said parking brakes can be immediately released upon activating said switch means to release air stored in said reservoir to said parking brakes while said pressure pump is replenishing air to said reservoir.

2. The air brake system according to claim 1 wherein said inlet port is coupled to said outlet connection of said reservoir by rigid metal tubing.

3. The air brake system according to claim 1 wherein said inlet port and said outlet port having at least a ¾ inch opening.

4. The air brake system according to claim 1 wherein said solenoid includes a lever to manually bias said piston in a raised position.

5. The air brake system according to claim 4 wherein said lever is mechanically coupled to a handle positioned in said operator's compartment of said vehicle for remote activation of said lever.

6. The air brake system according to claim 1 including a low pressure sensor mounted to said inlet port and electrically coupled to an alarm means for signaling when air in said reservoir drops to a predetermined level.

7. The air brake system according to claim 6 wherein said alarm means has an uninterrupted battery source providing alarm signaling when the vehicle is in a non operational mode.

\* \* \* \* \*